United States Patent [19]

Jorden, Jr. et al.

[11] E Re. 28,925

[45] Reissued Aug. 10, 1976

[54] NEUTRON METHOD FOR DETERMINING RESIDUAL OIL-PHASE FLUID CONCENTRATION

[75] Inventors: James R. Jorden, Jr., Houston, Tex.; Forrest R. Mitchell, Metaire, La.

[73] Assignee: Shell Oil Company, Houston, Tex.

[22] Filed: Dec. 17, 1973

[21] Appl. No.: 425,342

Related U.S. Patent Documents

Reissue of:

[64] Patent No.: 3,631,245
Issued: Dec. 28, 1971
Appl. No.: 786,132
Filed: Dec. 23, 1968

[52] U.S. Cl. ..... 73/152; 250/269
[51] Int. Cl.[2] ..... G01V 5/00
[58] Field of Search ..... 73/152; 250/259, 269, 250/270

[56] References Cited

UNITED STATES PATENTS

| | | | |
|---|---|---|---|
| 2,443,680 | 6/1948 | Herzog | 250/106 IL |
| 3,102,956 | 9/1963 | Armistead | 250/83.6 W |
| 3,757,575 | 9/1973 | Murphy et al. | 73/152 |

*Primary Examiner*—Jerry W. Myracle

[57] ABSTRACT

A method for determining the concentration of oil-phase fluid in an earth formation containing indigenous oil-phase fluid and aqueous liquid. A zone in the formation is irradiated with neutrons when the zone is filled with indigenous oil-phase and aqueous liquid. The thermal neutron capture rate response of the zone is measured with respect to the first irradiation. Substantially all indigenous oil-phase is removed from the zone and the zone is filled with only an aqueous liquid substantially equivalent in compositions to the indigeneous aqueous liquid. The zone is irradiated with neutrons a second time and the thermal neutron capture rate response of the zone is measured with respect to the second irradiation.

15 Claims, 1 Drawing Figure

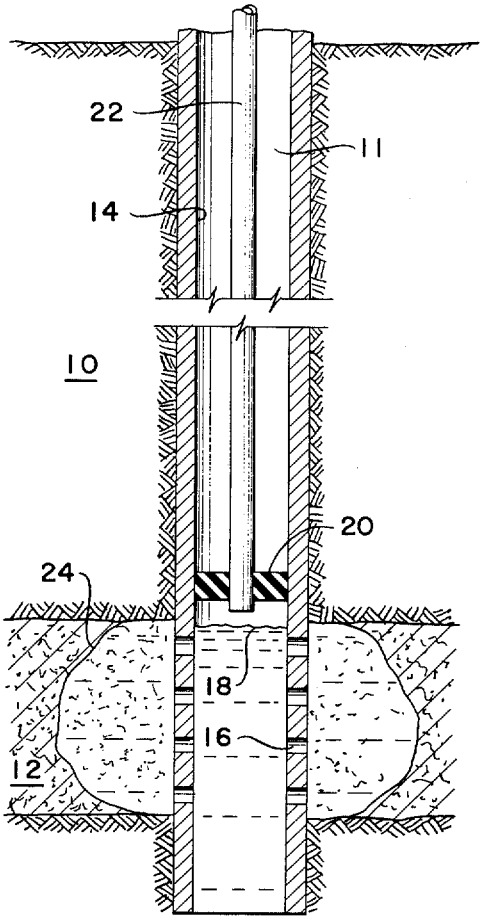
INVENTORS:
JAMES R. JORDEN, JR.
FORREST R. MITCHELL
BY: Louis J. Bovasso
THEIR ATTORNEY

NEUTRON METHOD FOR DETERMINING RESIDUAL OIL-PHASE FLUID CONCENTRATION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to well testing; and more particularly, to a method for determining the concentration of oil-phase fluid in an earth formation.

2. Description of the Prior Art

The importance of determining residual oil in place by means of subsurface logging techniques has been recognized for some time. At the present, new oil fields are becoming more difficult to discover and more attention is being given to secondary and tertiary methods of oil recovery in oil fields. In uncased intervals of a well extending into an oil formation, the oil content can be determined from resistivity logs if the resistivity of a salt-containing formation water within the surrounding formation is known and is of sufficient contrast in resistivity to the oil. It is understood that other parameters such as porosity and lithology must also be known. However, resistivity logs cannot distinguish between oil and fresh water, and it is impossible to obtain resistivity logs in cased wells. Most of oil fields that are being considered for secondary and tertiary recovery have only cased wells, since the field has already been produced by primary methods. The cost of drilling new wells for the sole purpose of running logs in uncased boreholes would in all probability render further recovery processes uneconomical.

The term "indigenous formation fluid" refers to the fluid in subterranean porous rock at the time investigation of a formation is initiated. In a virgin formation, it is a natural mixture of water-phase and oil-phase fluid or the presence of a water-phase fluid and an oil-phase fluid. In a formation that has been waterflooded, it is the fluids remaining in the formation at the end of the flooding operation. The oil-phase fluid may be oil, gas, or a mixture of oil and gas.

Conventional formation evaluation techniques are subject to large uncertainties in region of high water saturation. At 25 percent residual gas or oil saturation, the minimum probable error is about ±8 saturation percent, and at 10 percent residual saturation the probable error is about ±10 saturation percent.

Evaluations of gas-bearing intervals in open, or uncased, boreholes are subject to additional uncertainties due to gas solubility in filtrate water flowing into a water-receptive formation from a borehole. The decrease in residual gas saturation is proportional to filtration losses since, for most sandstones, the filtrate becomes gas saturated quite quickly. As an example of the magnitude of these effects, only 7 pore volumes of gas-free water is required to reduce residual gas by 10 saturation percent for assumed reservoir conditions of 3,000 p.s.i. and 160°F. (dry gas). Under these conditions, the short spaced resistivity and porosity devices would be affected to some degree even if low water loss muds are used. Pressure coring, used successively in residual oil applications, is subject to error due to gas solubility effects during filtrate flushing.

In copending application to Richardson et al., Ser. No. 633,963 filed Apr. 26, 1967, a method for determining residual oil in a formation that has been reduced to residual oil by water drive or waterflooding is disclosed. This method measures the thermal neutron decay first with the formation water and then with water having a materially different capture cross section substituted for the formation water at least within the radius of investigation of the logging tools. However, as discussed hereinabove, such a technique can be unsuitable for residual gas saturation determination because of the requirement for injection of large quantities of water. Due to problems associated with the solubility of natural gas, it would appear that a cased hole technique in order to determine residual gas saturation accurately is desirable. Also, the technique disclosed in the copending Richardson et al. application requires an independent measure of porosity and is not as accurate as desired.

SUMMARY OF THE INVENTION

It is an object of this invention to provide an improved method for accurately determining the concentration of indigenous oil-phase fluid in an earth formation.

It is a further object of this invention to provide a method for accurately determining the concentration of indigenous oil-phase fluid in an earth formation using the connate water originally present in the formation.

It is a still further object of this invention to provide a method for accurately determining the concentration of indigenous oil-phase fluid in an earth formation without the necessity of making independent porosity measurements.

These objects are carried out by irradiating a zone in the formation with neutrons when the zone is filled with indigenous oil-phase fluid and aqueous liquid. The thermal neutron capture rate response of the zone is measured with respect to the first irradiation and a supply of the indigenous aqueous liquid within the zone is preferably produced therefrom. Substantially all indigenous oil-phase fluid is removed from the zone and the zone is filled with only indigenous aqueous liquid or a liquid having a neutron capture cross section substantially equivalent to that of the indigenous aqueous liquid. The zone is irradiated with neutrons a second time and the thermal neutron capture rate response of the zone is measured with respect to the second irradiation. The quantity of indigenous oil-phase fluid saturation times porosity is determined from the difference between the measured first and second responses.

BRIEF DESCRIPTION OF THE DRAWING

The drawing is an elevation view of a borehole illustrating the method of this invention.

DESCRIPTION OF THE PREFERRED EMBODIMENT

The theory, equipment and techniques utilized in the present invention are generally similar to those utilized in the copending application to Richardson with the exception of the changes that are made in the fluids in the measuring zone between the measurements of the neutron capture rates. Further, where applicable, the discussions in the aforementioned Richardson application pertaining to the carrying out of his invention are incorporated herein by reference.

It can be seen from the discussion in the copending application to Richardson et al., in pulsed neutron capture (PNC) logging the total capture cross section, $\Sigma T$, of an interval is comprised of contributions from the rock matrix, $\Sigma_R$, and contained fluids, $\Sigma_W$ and $\Sigma_{hc}$. This was expressed in the copending application of Richardson as $$\Sigma T_1=\Sigma_R(1-\Phi)+\Sigma_{W_1}SW\Phi+\Sigma_{hc}(1-S_W)\Phi \quad (1)$$

where $\Sigma T_1$=total capture cross section for the first measurement, $\Sigma_R$=capture cross section of the formation rock, $\Phi$=porosity of the formation expressed as a fraction, $\Sigma_{W_1}$=capture cross section of the water contained in the formation for the first measurement, $S_W$=fraction of the pore volume containing water, and $\Sigma_{hc}$=capture cross section of the hydrocarbon. However, as Richardson et al. pointed out, values for $\Sigma_R$ and $\Sigma_{hc}$ are not required if there are two values of $\Sigma_W$ satisfying equation (1) and if the change in $\Sigma_W$ brings about no change in hydrocarbon saturation. The latter condition is not practicable where a free gas phase is present.

However, inasmuch as natural gas is soluble to some extent in water, and since PNC logging tools are shallow investigating device, it may be feasible to remove gas saturation from a short homogeneous interval by flushing it thoroughly with formation of water. It has been found that approximately 21 pore volumes of water should be sufficient to remove a residual gas saturation (dry) of 30 percent under reservoir conditions of 3,000 p.s.i., 160°F. Removal of gas up to 12 inches from the sand face would be adequate in view of the shallow investigating characteristics of PNC logging tools. A large excess of injected water may be used in order to account for permeability variations, etc. As discussed hereinabove, saturation of injected water by gas takes place so rapidly that the process is, as a practical matter, rate insensitive. If it is found that gas removal is not highly efficient using water, a liquid hydrocarbon absorber, such as acetone, may be used. The absorber should be miscible with formation water which would follow in turn.

The expression for total capture cross section after removal of residual gas by one means or another and complete saturation of the pore space with formation water is:

$$\Sigma_{T_2}=\Sigma_R(1-\Phi)+\Sigma_W\Phi \quad (2)$$

where $\Sigma_{T_2}$=total capture cross section at the second measurement.

Rewriting equation (1) in terms of gas saturation and combining with (2), we have $$\Sigma_{T_1}=\Sigma_R(1-\Phi)+\Sigma_{W_1}(1-S_{GR})\Phi+\Sigma_G S_{GR}\Phi$$

$$S_{GR}=\frac{(\Sigma_{T_2}-\Sigma_{T_1})}{\phi(\Sigma_{W_1}-\Sigma_G)} \quad (3)$$

where $S_{GR}$=fraction of the pore volume containing gas and $\Sigma G$=capture cross section of the gas contained in the formation.

The application of equation (3) will necessarily be in cased wells where porosity data may not be available. Further, accurate porosity data are essential since uncertainties in this parameter have been found to constitute a major source of error. A porosity determination may be made utilizing pulsed neutron capture log response by performing a second displacement with, say, high-salinity water to change the value of $\Sigma_W$ in (2):

$$\Sigma_{T_3}=\Sigma_R(1-\Phi)+\Sigma_{W_2}\Phi \quad (4)$$

where $\Sigma_{T_3}$=total capture cross section for the third measurement (i.e., after injection of high-salinity water) and $\Sigma_{W_2}$=capture cross section of the saline-treated water contained in the formation at the third measurement.

Combining (2) and (4) and solving for $\Phi$:

$$\phi=\frac{(\Sigma_{T_3}-\Sigma_{T_2})}{(\Sigma_{W_2}-\Sigma_{W_1})} \quad (5)$$

Substituting in (3) gives:

$$S_{GR}=\frac{(\Sigma T_2-\Sigma T_1)(\Sigma W_2-\Sigma W_1)}{(\Sigma T_3-\Sigma T_2)(\Sigma W_1-\Sigma G)} \quad (6)$$

which requires three logging measurements and a knowledge of $\Sigma G$ and $\Sigma W$ for two waters.

The foregoing calculations may also be used to determine residual oil. The major potential for residual oil determination lies in cased intervals of old wells where good porosity data is not available. The sequence of operations outlined hereinabove may be carried out in a zone containing residual oil if the trapped oil were to be miscibly displaced by injecting a lug of mutual solvent and driving it with formation water. Alternatively, a preferentially oil-soluble solvent slug may be injected followed by a preferentially water-soluble solvent slug. Small amounts of such material are sufficient to displace the residual oil beyond the depth of investigation of the pulsed neutron capture logging procedure disclosed by Richardson et al. and permit the determination of residual oil saturations without independent porosity control. Additional passes may be taken so as to achieve as low a probable uncertainty of saturation percent as possible. The procedure of this application for determining residual oil saturation permits the determination of the porosity utilizing the method disclosed by Richardson.

From the foregoing, it can be seen that the present invention may be used in conjunction with the method disclosed in the copending application to Richardson et al. in order to measure porosity, rock-capture cross section and other properties of the formation being investigated.

A further feature of the present invention significantly improves the accuracy available to a residual oil determination. Thus, referring now to the drawing, there is shown a well bore hole 11 that penetrates a nonproducing formation 10 and a producing formation 12. The producing formation 12, the earth formation zone to be investigated, is assumed to be a uniform formation. However, the method of this invention will also work with nonuniform formations. In the case of nonuniform formations, errors may be introduced due to inability to assume a constant porosity for the formation. The well borehole 11 is assumed to be cased with a casing 14 having a series of perforations 16 adjacent the producing formation 12, although the invention will work equally well in uncased holes. Such casings are usually surrounded by a cement sheath (not shown) and perforations 16 are extended through the cement sheath. One or a few perforations can be used as long as a zone around the borehole can be substantially uniformly swept by fluid injected through the perforations. All the production tubing, packers, and other equipment are assumed to be removed from the zone being tested within well borehole 11. Further in respect to measurements of residual oil saturation, it is assumed that the well borehole 11 has been produced until its oil content is at least as low as a waterflood residual, e.g., by a natural water drive or a secondary recovery process such as waterflooding or other type of flood. In some formations, especially those that were produced by a gas drive, it may be necessary to flood the formation with an aqueous liquid before the first measurement in order to displace gas away from the zone being investigated.

The first step in the method of this invention is to obtain a thermal neutron decay measurement with the oil content being that of the indigenous formation fluid, rather than necessarily being at least as low as waterflood residual as disclosed in the copending application of Richardson et al. In the Richardson et al. procedure, those cases where the formation has not been reduced to the residual oil level, it is necessary to inject water into the formation to insure that the formation is reduced to the residual oil level. Of course, it is only necessary to inject sufficient water to exceed the radius of investigation of the logging tool. For example, a salt water containing approximately 20,000 p.p.m. of NaCl and having a cross section of approximately $2.9\times10^{-2}$ cm. $^{-1}$ could be injected into the formation in the amount of 1 bbl. per foot of zone to be investigated around a borehole having a diameter of 6¼ inch.

The thermal neutron decay measurements may be obtained by running one of the commercially available tools in the well and recording the counting rates indicated as $N_1$ and $N_2$. The operation of such tools can be more easily understood by referring to FIG. 2 of Richardson et al. showing the decay curve for thermal neutrons in a borehole and surrounding formations. The pulse 30 represents the pulse of fast neutrons generated by the neutron source in the tool. This pulse may have a length of about 30 microseconds. Following the initial pulse, the neutron intensity is allowed to decay before the start of the first counting interval. The normal delay is approximately 400 microseconds. The first counting interval $t_1$ may be approximately 200 microseconds long and after a delay of an additional 100 microseconds, the second 200-microsecond counting interval $t_2$ is started. The curve 32 represents the approximate exponential decay of the thermal neutron intensity while the intervals 36 and 38 represent the two counting intervals. The background level of radioactivity in the borehole is represented by the horizontal line 34. From an inspection of this curve, it is readily appreciated that the background level must be known within reasonable accuracy in order for the two counting intervals 36 and 38 to be meaningful. Such tools are usually moved along the zone being inspected so that they indicate the variation with depth of the counting rate during each of the counting intervals.

During the logging of a borehole it is desirable to determine the background radioactivity in the borehole. The present invention may utilize various methods for determining background level. One method consists of moving the logging tool, preferably by pulling it up the well borehole 11 towards a selected depth. Upon reaching the selected depth, the tool is stopped and, simultaneously, the neutron source is turned off. The induced radioactivity is recorded during the following 40 seconds, and the recorded curve is extrapolated to the time at which the source was turned off. A plurality of runs are made in this manner, at least 10 being desirable to reduce the statistical error. This thus provides an accurate measurement of the background level of the formation surrounding the borehole 11. This background level is primarily the decay of the nitrogen-16.

Another method for determining the background radioactivity is to inject a saturated boric acid water solution into the zone of earth formation to be investigated. Boric acid has a high capture cross section and thus will absorb essentially all the thermal neutrons before the first measurement is made by a logging tool having a delay of at least about 400 microseconds preceding the measurement. While the thermal neutrons are absorbed, the induced nitrogen-16 radioactivity will not be affected, since it is produced by a fast neutron reaction. Thus, the resulting measurement will be almost essentially the background level of the formation. Again it would be desirable to make repeated runs to obtain a sufficiently high number of counts to determine the background level of the formation with accuracy.

The first PNC log is run into reservoir 12 within the borehole 11 with indigenous oil and formation water contained in the reservoir 12 near the borehole. The thermal neutron capture rate response is measured as disclosed in the copending application to Richardson et al. Preferably, a supply of the indigenous oil and aqueous liquid within reservoir 12 is produced therefrom. By conventional chemical flooding techniques with borehole 11 being used as an injection well, all the residual oil is removed from the formation within the radius of investigation of the PNC log. This "cleaned" formation is then resaturated with original formation water or a liquid of substantially the same concentration of formation salts.

Next, a second PNC log is run into the borehole with only formation water contained in the reservoir near the borehole and the thermal neutron capture rate response is measured a second time.

The foregoing may be accomplished by withdrawing the logging tools from the borehole 11, or disposing it so that fluid may be injected past it, and a packer 20 is set immediately above the formation 12. A suitable tubing string 22 is run through the packer 20 so as to inject the previously separated indigenous liquid into formation 12. Tubing string 22 may also be used to remove the oil and aqueous liquid from the formation 12.

After the above data is obtained, the simultaneous equations may be solved either manually or by the use of a computer as illustrated in FIG. 3 of the copending application to Richardson et al. which discussion is also incorporated herein by reference.

Alternatively to determining the porosity as disclosed by Richardson, the two PNC logs, i.e. the logs taken before and after removal of the residual oil, give equations (1) and (2), discussed hereinabove, for the total formation capture cross section measured by logs 1 and 2, respectively.

The difference of equations (1) and (2) is independent of $\Sigma_{LR}$ (where $\Sigma_{LR}$=capture cross section of matrix), i.e.:

$$\Sigma_{T_1}-\Sigma_{T_2}=\Sigma_{W_1}-\Sigma_{hc}\,(1-S_W)\Phi=(\Sigma W_1-\Sigma_{hc})S_{OR}\Phi$$

or $$S_{OR}\phi=\frac{\Sigma_{T_2}-\Sigma_{T_1}}{\Sigma_{W_1}-\Sigma_{HC}} \qquad (8)$$

where $\Sigma_{W_1}$=capture cross section of water in formation during log No. 1 and $S_{OR}$=fractional residual oil saturation.

Tests have shown that the uncertainty in residual oil determination using the chemical flood technique of this invention is less than one saturation percent. Thus, the error reduction provided by the present invention may be materially greater than the method of Richardson et al. in respect to oils which contain some gas or in respect to subterranean porous rocks in which the oil-phase fluid is a gas.

Comparing both the method of this invention and the two-water flood technique disclosed by Ricardson et al., the Richardson et al. technique measures water saturation directly while the chemical flood technique of this invention measures oil saturation directly. This being the case, the two-water flood technique requires an independent measure of porosity in addition to the PNC log measurements, whereas the chemical flood technique requires only the NLL measurements for an estimate of oil contained by unit reservoir bulk volume. Thus, the chemical flood technique of this invention leads to more certain estimates of oil-in-place since fewer measurements are required. The present technique provides a means for increasing the accuracy of the measurements of residual oil. In the following example, it can be seen that, where the oil-phase fluid is free of gas, the uncertainty in an oil-in-place determination is reduced to two thirds of that obtained by the procedure disclosed in the copending application to Richardson.

EXAMPLE 1

The following is an example comparing the relative accuracies of the two saturation measuring techniques, that is, the two-water flood technique of Richardson et al. and the chemical flood technique of this invention. A hypothetical oil reservoir having the following properties is assumed.

| | |
|---|---|
| Area(A) | 2,000 acres ± 100 acres |
| Oil-Sand Thickness ($h$) | 20 feet ± 1 foot |
| Porosity($\phi$) | 0.300 ± 0.01 |
| Residual Oil Saturation | 0.250 |
| Capture Cross Sections | |
| 1. Formation Water ($\Sigma_{w_1}$) | $60.0 \times 10^3$ cm.$^{-1}$ ± $0.600 \times 10^3$ cm.$^{-1}$ (113,000 mg./l NaCl) |
| 2. Injection Water ($\Sigma_{w_2}$) | $100 \times 10^{-3}$ cm.$^{-1}$ ± $1.00 \times 10^3$ cm.$^{-1}$ (229,000 mg./l NaCl) |
| 3. Hydrocarbons ($\Sigma_{hc}$) | $19.0 \times 10^3$ cm.$^{-1}$ ± $0.570 \times 10^3$ cm.$^{-1}$ |

Substituting in both the equations presented in the copending Richardson et al. application relating to the two-water flood technique and in the equations presented in this application relating to the chemical flood technique, taking into consideration individual error contributions and total error or uncertainty in oil-in-place for both techniques, we find that the best estimate of oil-in-place is $23.3\times10^6$ bbl. with an uncertainty of $\pm2.94\times10^6$ bbl. when measuring residual oil by the two-water flood technique as compared to an uncertainty of $\pm2.01\times10^6$ bbl. using the chemical flood approach. For the conditions assumed, the chemical flood technique appears to be a more accurate method.

EXAMPLE II

The following is an example of a proposed use of the technique of this invention in a new well to be drilled in the Good Hope field in Louisiana.

Estimated data expected to apply to the section of interest in the new well include: Temperature ≈ 190°F., porosity ≈ 32 percent, permeability ≈ 2,800 md., bottom hole pressure ≈ 3,800 p.s.i., depth 8,300 ft., formation water total dissolved solids ≈ 116,000 p.p.m., formation water multivalent ion concentration ≈ 3,500 p.p.m., residual oil saturation ≈ 15 percent, and thickness of interval to be flooded by chemical ≈ 15 ft. To insure that residual oil is moved outside the zone of investigation of the logging tool, it is desired to flood out a minimum radius of two feet from the borehole.

Composition of the recommended chemical system as indicated by emulsion tests at field temperature with field crude is as follows: Sulfonate—0.045 meq. g., NaCl—20,000 p.p.m., and sodium tripolyphosphate—5,000 p.p.m. Viscosity of the solution at 190°F. and at a shear rate of 230 sec$^{-1}$ is 0.6 cp. Oil viscosity is estimated to be 0.5 cp. at reservoir temperature. Compatibility of this sulfonate system with formation water is not complete; dilution with 25 percent by volume of formation water will cause "salting out" and flocculation of sulfonate. It will, therefore, be necessary to both precede and follow the sulfonate injection with the injection of water containing 20,000 p.p.m. of sodium chloride.

It is expected that the zone of interest for the test will be overlain by a zone having high oil saturation and underlain by a zone of zero oil saturation. No significant change in rock properties in these three layers is expected and vertical communication must be assumed. Sulfonate injected into the intermediate saturation zone of interest will tend to move down into the high water saturation zone. Consideration should be given to this potential "sweep" problem in the design of the perforating pattern, in the determination of injection rates to be used in the test, and in the determination of total volume of sulfonate to be injected. If this under running problem did not exist, it would be desirable to inject sulfonate in a volume equivalent to two pore volumes of the zone to be swept. To sweep a radial zone having a diameter of 4 feet would require about 3 bbl. per foot of section or a total of 45 barrels for the expected 15 ft. section. To provide adequate safety factor, it is recommended that at least 100 bbl. of sulfonate be injected. This solution should be preceded and followed by 25 barrels of water containing 20,000 p.p.m. NaCl.

To provide a sulfonate solution having the desired physical and chemical properties it is necessary that proper mixing procedures be followed and that the temperature of the final solution not be allowed to drop below 30°C. Two preliminary or "stock" solutions should be prepared first (minimum temperature −5°C.). These "stock" solutions are then mixed in equal volumes to prepare the final solution. Water used in preparation of the solutions should have zero undissolved solids and should have less than 1,000 p.p.m. total dissolved solids.

Stock solution "A" is prepared by dissolving three drums (1,300 lb.) of the aforementioned sulfonate concentrate in 47 barrels of water. Solution "B" is prepared by dissolving 175 lb. of sodium tripolyphosphate and 700 lb. of salt in 49 barrels of water. These solutions can be prepared as long in advance of use as is desired. After they are mixed in equal volumes, sulfonate will be precipitated if the solution is allowed to stand for several hours at temperatures below 30°C. A satisfactory handling procedure would be to pump simultaneously and at the same volumetric rate from two stock tanks into the well. Adequate mixing and temperature control would be achieved in the lines and tubing before the solution reached the formation face.

We claim as our invention:

1. In a method for determining the concentration of indigenous oil-phase fluid in an earth formation containing indigenous oil-phase fluid and aqueous liquid, the process comprising the steps of:

irradiating with a pulse of neutrons a zone within said formation when said zone is filled with said indigenous oil-phase fluid and aqueous liquid;

measuring the thermal neutron capture rate response of the zone to said irradiation;

removing substantially all indigenous oil-phase fluid from the zone;

filling said zone with an aqueous liquid substantially equivalent in composition to said indigenous aqueous liquid;

irradiating the zone with a pulse of neutrons a second time;

measuring the thermal neutron capture rate response of the zone to said second irradiation; and determining the quantity of the indigenous oil-phase fluid saturation times porosity from the difference between said measured first and said second responses.

2. The method of claim 1 including the step of flooding said earth formation with an aqueous liquid prior to first irradiating said zone so as to displace any gas present in said formation away from the zone being irradiated.

3. The method of claim 1 including the step of producing said well until its oil content is at least as low as waterflood residual prior to irradiating said zone a first time.

4. The method of claim 3 wherein the step of producing said well includes the step of injecting sufficient water into said well so as to reduce the residual oil level.

5. The method of claim 4 wherein the steps of injecting sufficient water includes injecting salt water sufficient to exceed the radius of investigation of the zone.

6. The method of claim 1 including the step of producing therefrom a supply of the indigenous oil-phase fluid and aqueous liquid within said zone; and separating said aqueous liquid from said indigenous oil-phase fluid; and employing said separated aqueous liquid in the step of filling said zone with an aqueous liquid.

*7. A method of measuring water saturation in a subsurface zone penetrated by a well bore which comprises the steps of:*

*a. running a logging instrument in said well bore to measure the water saturation of the rock in said zone adjacent said well bore,*

*b. injecting a driving fluid through said well bore into said zone to displace oil out of the rock immediately surrounding the well bore, said driving fluid easily driven through the rock by a second driving fluid having the same logging characteristics as the water in the rock at the time of Step (a),*

*c. injecting said second driving fluid through said well bore into said zone to drive said first driving fluid from the zone immediately adjacent the well bore, and*

*d. after Step (c), repeating Step (a).*

*8. A method as defined in claim 7 in which Step (a) is the running of a thermal neutron decay time log.*

*9. A method as defined in claim 7 in which said first driving fluid is a micellar solution having mutual solubility in oil and in water.*

*10. A method as defined in claim 9 which comprises the step of injecting a water slug before Step (c).*

*11. A method as defined in claim 10 which includes the step of injecting water after Step (c).*

*12. A method as defined in claim 7 in which before Step (a) the well is conditioned to produce as near as possible the same fluid saturation adjacent the bore as that present in the rock formation remote from the well bore.*

*13. A method as defined in claim 7 when used in a zone having gas saturation, the method including the step of running logs to determine the gas saturation, such logs to be run after Step (a) and before Step (b).*

*14. A method of measuring water saturation in a subsurface zone penetrated by a well bore which comprises the steps of:*

*1. measuring the water saturation of the rock in said zone adjacent said well bore,*

*2. thereafter reducing to zero the oil saturation of the rock immediately surrounding the well bore,*

*3. filling the pore space of the rock adjacent the well bore with a fluid having the same logging characteristics as the water in the rock at the time of Step (1),*

*4. after Step 3 again measuring the water saturation of the rock in said zone adjacent said well bore.*

*15. A method for determining the residual oil in an oil bearing formation penetrated by the borehole of a well comprising the steps of:*

*a. logging said formation to obtain logging data measurements of the relative quantities of residual oil and formation water present in the formation;*

*b. injecting into said formation, through said borehole, a sufficient amount of an oil miscible solution, to displace substantially all of the residual oil in said formation surrounding said borehole to a distance exceeding the radius of investigation of the logging means providing the logging data;*

*c. injecting into said formation through said borehole a sufficient amount of water to displace substantially all of said oil miscible solution and cause said formation being tested to be substantially* 100% water saturated; and

*d. logging for a second time said formation to obtain logging data measurements; and*

*e. comparing the logging data measurements of said second log with the logging data measurements of said first log to determine the amount of residual oil in said formation.*

* * * * *